United States Patent [19]

Theofanous

[11] Patent Number: 4,918,980

[45] Date of Patent: Apr. 24, 1990

[54] DIESEL ENGINE TIMING APPARATUS AND METHOD

[76] Inventor: Theos E. Theofanous, 4747 Kester Mill Rd., Winston-Salem, N.C. 27103

[21] Appl. No.: 271,497

[22] Filed: Nov. 15, 1988

[51] Int. Cl.[5] .................... G01M 15/00

[52] U.S. Cl. .................... 73/119 A; 324/391

[58] Field of Search .................... 73/119 A, DIG. 11; 324/391

[56] References Cited

U.S. PATENT DOCUMENTS

| | | | |
|---|---|---|---|
| 2,949,498 | 8/1960 | Jackson | 250/211 J X |
| 3,363,155 | 1/1968 | Newman | 250/211 J X |
| 3,424,908 | 1/1969 | Sitter | 250/211 J X |
| 4,185,494 | 1/1980 | Yelke | 73/119 A |
| 4,373,384 | 12/1983 | Olson et al. | 73/119 A |
| 4,423,624 | 1/1984 | Dooley et al. | 73/119 A |
| 4,441,021 | 4/1984 | Olson et al. | 73/227 |
| 4,484,469 | 10/1984 | Grover et al. | 73/119 A |
| 4,493,208 | 1/1985 | Grover | 73/117.3 |
| 4,506,546 | 3/1985 | Olson et al. | 73/119 A |
| 4,545,238 | 10/1985 | Kinoshita et al. | 73/117.3 |
| 4,648,266 | 3/1987 | Ikeda | 73/117.3 |
| 4,658,642 | 4/1987 | Ikeda | 73/119 A |
| 4,680,960 | 7/1987 | Yamanaka et al. | 73/117.3 |

*Primary Examiner*—Jerry W. Myracle

*Attorney, Agent, or Firm*—Olive & Olive

[57] ABSTRACT

A diesel engine timing apparatus comprising a luminosity probe including a photocell which in response to light generated by combustion of fuel in a selected chamber of the diesel engine generates an on or off signal depending on the respective presence or absence of light. Electronic circuitry elements process the on or off signal to produce an amplified output signal which is transmitted to light-generating elements disposed externally of the engine, e.g., a conventional inductive pick-up, strobe-type timing light. A pulsed visible light signal is thereby generated which may be employed to adjust the engine timing to a selected value in a conventional manner, by aligning of fixed and adjustable timing marks on stationary and motive portions of the diesel engine. The disclosed system is devoid of any magnetic probe or magnetic sensing structure.

12 Claims, 2 Drawing Sheets

DIESEL ENGINE TIMING APPARATUS AND METHOD

BACKGROUND OF THE INVENTION

1. Field of The Invention

This invention relates to apparatus for selectively adjusting the timing of a diesel engine, and to an associated method of timing of a diesel engine.

2. Description of The Related Art

In the operation and maintenance of diesel engine power systems, it generally is very difficult to adjust the timing of the engine. Such difficulty is associated with the complex, labor-intensive, time-consuming, and resultingly costly character of the conventional methods employed for selectively adjusting the timing of diesel engines.

Taking as an example the MERCEDES 240D automotive diesel engine, the timing procedure for this engine in accordance with factory specifications may cost on the order of $250, at current prices. This high cost results from the fact that a very skilled and experienced diesel injection mechanic is required to do such work, and the fact that even when done by a competent mechanic, this work is complex and requires a substantial time to complete.

Typically, then, the adjustment of injection pump timing on diesel engines involves numerous and complicated procedures, which the majority of mechanics cannot do, since they lack the specialized equipment and training required therefor.

U.S. Pat. No. 4,441,021 to G. E. Olson et al, discloses a luminosity probe for a diesel engine timing apparatus. The disclosed probe comprises two telescopingly engaged sections, including a first portion which is exteriorly threaded for mounting in place of the glow plug in a selected diesel engine cylinder. A second portion of the probe, proximal to the first portion, contains a phototransistor located rearwardly of a light pipe in the first portion. This light pipe directs light from the combustion in the cylinder, to the phototransistor. The resulting electrical signal from the phototransistor then is carried via a cable to signal processing circuitry.

The foregoing luminosity probe is used in combination with a magnetic sensing device, located in effective relation to a moving engine part such as a notch in the harmonic balancer. The notch passes the sensing device a known number of degrees of engine and crankshaft rotation after the piston in the cylinder containing the luminosity probe has reached its top-dead-center position. The magnetic sensing device generates an electrical signal when the notch passes, and this signal is processed in associated circuitry. The processed signals from the magnetic probe and the luminosity probe then are passed to a degree meter, and the service person adjusts the fuel injection pump, so that the degrees displayed on the meter match the degrees specified by the engine manufacturer for a specific engine speed.

Related to the foregoing patent is U.S. Pat. No. 4,373,384 to G. E. Olson et al, describing circuitry which may be employed in a luminosity probe/magnetic probe timing system. Such circuitry includes a timer, for producing a recurring timer signal commencing with the electrical signal recurrently produced by the phototransistor, but with the timer signal having a substantially greater duration. A first pulse generator is responsive to the leading edge of the timer signal, and produces a train of first pulses each having a duration substantially shorter than the timer signal duration.

The second recurring electrical signal produced by the magnetic probe is passed to a second pulse generator responsive to the leading edge of the magnetic probe signal, to produce a train of second pulses. Circuitry is coupled to the first and second pulse generators, and is responsive to each first pulse, to start an output pulse, and to each second pulse, to terminate the output pulse. Display means are provided to display information corresponding to the duration of the output pulses, with an offset voltage being applied to the display means, to compensate for delay in the system relative to the actual top-dead-center event.

The timing adjustment apparatus disclosed in the aforementioned Olson et al patents requires two separate probe assemblies, viz., a luminosity probe comprising a phototransistor, and a magnetic probe. Although the luminosity probe is adapted for mounting in the glow plug opening of the diesel engine, and thus can be adapted to any diesel engine for which the exterior threading of the luminosity probe is appropriately sized, the majority of diesel engines do not have places or suitable structure for connecting the magnetic probe in the manner taught by these patents. Accordingly, the majority of diesel engines would have to modified to accommodate the magnetic probe disclosed in the Olson et al patents, since engine pump timing adjustment could not otherwise be achieved with the Olson et al apparatus.

Further, it is apparent that the Olson et al apparatus is complex, representing a specialized optical/magnetic timing system characterized by its own complicated specifications for proper operation.

Accordingly, it is an object of the present invention to provide a diesel engine timing adjustment apparatus and associated pump timing adjustment method which are simple in character, low in cost, and easy to employ.

It is another object of the invention to provide a diesel engine timing apparatus and method of such type, which may be employed with a conventional strobe-type timing light, e.g., of the hand-held gun type which is used for timing adjustment of gasoline-powered engines.

Other objects and advantages of the invention will be more fully apparent from the ensuing disclosure and appended claims.

SUMMARY OF THE INVENTION

In a general apparatus aspect, the present invention relates to a diesel engine timing assembly in which a luminosity probe, adapted for mounting in a glow plug opening in the diesel engine, transmits light deriving from the combustion of fuel in the engine, to a photocell operatively associated with the luminosity probe. The photocell generates an on or off signal depending on the respective presence or absence of light received by the photocell, and this on or off signal is processed by electronic circuitry means and passed to light-generating means disposed externally of the diesel engine, e.g., an inductive pick-up, strobe-type timing light. The light produced by the light-generating means then may be directed to the flywheel or crank pulley of the diesel engine, to show the mechanic the exact position of the piston upon firing, so that the injection pump can be adjusted to set the timing to a desired selected value.

Thus, there is provided an apparatus which permits the diesel engine to be timed in a simple, quick, and economical manner, analogous to the use of conventional strobe-type timing lights to set the timing of gasoline-powered internal combustion engines.

In a further, more specific apparatus aspect, the present invention relates to a diesel engine timing assembly for a diesel engine system including a high voltage coil and a power supply, the timing assembly comprising:

(a) a luminosity probe comprising a housing adapted to be mountable in a glow plug opening of a selected cylinder of a diesel engine, such housing comprising a light-transmission housing portion adapted to transmit light from combustion of fuel in the selected cylinder into the housing;

(b) a photocell mountable in effective relation to the luminosity probe housing for receiving light transmitted into the housing and generating an on or off signal depending on the respective presence or absence of light received by the photocell;

(c) an inductive pick-up, strobe-type timing light operatively connectable to the coil and to the power supply; and (d) an amplifier operatively attachable (i) in signal receiving relationship to the photocell, for receiving the on or off signal therefrom, and amplifying same to produce an on or off output signal; (ii) to the power supply; and (iii) to the coil, so that the on or off output signal is transmittable from the amplifier to the coil, to generate a corresponding voltage signal which is inductively transmittable from the coil to the timing light when operatively connected therewith.

The diesel engine timing assembly of the present invention is most suitably devoid of any magnetic probe or magnetic sensing structure, thereby achieving a material simplification of the timing apparatus, relative to the prior art luminosity probe/magnetic probe timing systems discussed above in the "Background of the Invention" section hereof.

In a further aspect, the luminosity probe housing may be of generally tubular shape and the light-transmissive housing portion comprises a distal end face of the housing, with a light pipe extending axially in the housing and having a distal end in proximity to the end face of the housing. A casing is coupled to the luminosity probe housing and has the photocell mounted therein, in proximity to a proximal end of the light pipe. In this aspect, the luminosity probe housing and the photocell casing may suitably be detachably coupled to one another.

In a preferred aspect, the signal processing circuitry and the timing light of the inventive timing system are comprised in a single hand-held timing unit.

In other aspects, the diesel engine timing assembly may further comprise an adjustable crankshaft degree gauge to visually indicate the crank degree of timing, and/or a tachometer to visually indicate the engine speed.

In a method aspect, the present invention relates to a method of adjustably timing a diesel engine, including providing a diesel engine timing assembly comprising a photocell containing luminosity probe, and timing light, such as variously generally described above. After operating temperature is achieved by operation of the diesel engine, the glow plug of a selected cylinder of the engine is removed and the luminosity probe is mounted in its place. With the engine running the photocell in the probe generates an on or off signal depending on the respective presence of absence of light from the combustion in the cylinder of the engine on which the probe has been mounted. This on or off signal then is amplified and may for example be passed to the coil of the engine for inductive pick-up by the timing light. The timing light, producing a pulsed (stroboscopic) light signal, is directed onto a moving engine part, such as a flywheel, crankshaft, crank pulley, or the like, to visually indicate the extent of deviation of the injection pump timing from a desired selected value. The engine then is mechanically adjusted, such as by adjustment of the engine injection pump, to achieve the desired combustion timing.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
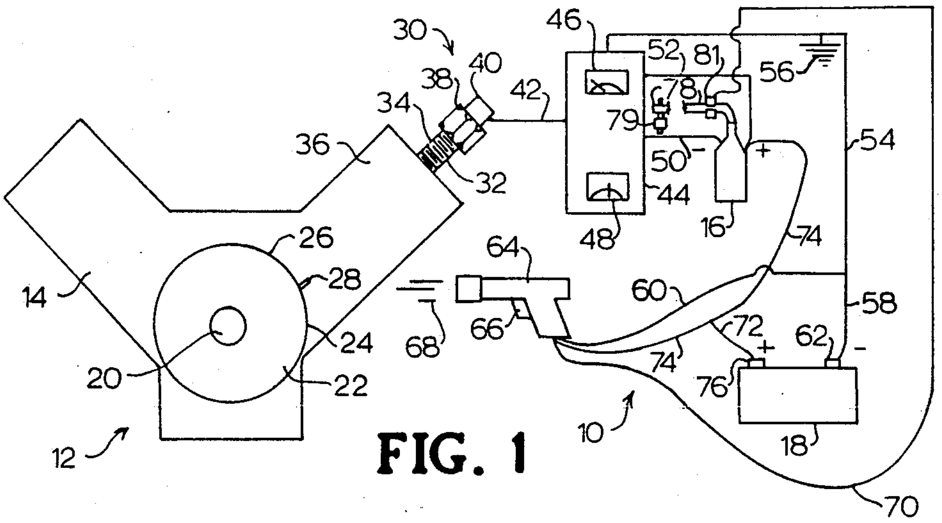
FIG. 1 is a schematic representation of a diesel engine timing assembly according to one embodiment of the present invention.

The timing assembly of the present invention is usefully employed to selectively set the combustion timing of a diesel engine in a simple and efficient manner, using an inductive pick-up, strobe-type timing light, of the type employed for conventional timing of gasoline-powered internal combustion engines. Referring now to FIG. 1, there is shown a schematic representation of a diesel engine timing assembly 10 and a diesel engine system 12. The engine system 12 comprises diesel engine 14, high voltage coil 16, and power source 18.

Diesel engine 14 comprises crankshaft 20, on which is mounted a flywheel 22 for rotation therewith. The flywheel may be of generally cylindrical shape, and has on its peripheral edge 24 a timing mark 26. Upon proper combustion timing of the engine in accordance with the engine manfacturer's specifications, the timing mark 26 will align with timing mark 28 on the stationary structure of engine 14 which is in proximity to the flywheel timing mark 26. The timing marks 26 and 28 may be simply indentations, grooves, or the like in the respective flywheel and engine body surfaces, or may be demarcated by painted lines, e.g., of fluorescent paint, or may be provided in any other suitable manner, as is known per se in the art.

The diesel engine timing assembly 10 comprises a luminosity probe 30 including a probe housing 32 which is threaded on an exterior surface 34 to allow the housing to be threadably engaged in the glow plug opening of a selected cylinder, as for example the number 1 cylinder 36 of diesel engine 14.

The probe 30 thus includes an anterior or distal housing portion 32, an intermediate boss portion 38, and a posterior or proximal casing portion 40. The intermediate boss portion 38 permits the luminosity probe to be engaged with suitable wrench or other tool means, to engage the threads on the distal housing portion with complementarily configured threads in the interior of the glow plug opening in the selected cylinder.

The luminosity probe 30, as hereinafter described in greater detail, is mounted in the cylinder opening and the distal portion thereof transmits light from combustion of fuel in the selected cylinder through the housing to a photocell mounted in the probe housing and receiving light transmitted into the housing. The photocell generates an on or off signal depending on the respective presence or absence of light it receives.

Luminosity probe 30 is joined by signal transmission cable 42 to amplifier circuitry schematically represented by the signal processing module 44. Operatively mounted on the amplifier module 44 are a crankshaft degree gauge 46 and a tachometer 48.

The amplifier module 44 is connected by electrical wire 50 to the negative secondary terminal of the high voltage coil 16. The amplifier module also is joined to the positive secondary terminal of this coil, by electrical wire 52. The amplifier module further is attached by electrical wire 54 to ground 56, by branch lines 58 and 60 to power source 18 at its negative terminal 62, and by branch line 60 to a hand-held, strobe-type timing light gun 64. The timing light gun 64 is equipped with a manually actuatable trigger 66 to selectively produce stroboscopic output light 68 during the operation of the timing system, as hereinafter more fully described in detail.

The positive secondary terminal of the high voltage coil 16 is joined by electrical wire 70 and branch line 72 to the positive terminal 76 of power supply 18, and by electrical wire 70 and branch line 74 to the timing light gun 64, respectively.

The power source 18 may be of any suitable type, as for example a conventional 12-volt automotive battery.

In the operation of the timing adjustment system shown in FIG. 1, and prior to installation of the luminosity probe in the number 1 cylinder 36 of the diesel engine 14, the engine, having its glow plug reposed in the number 1 cylinder, is operated until a desired operating temperature is achieved. Upon reaching such selected temperature, and after shutting off the engine, the glow plug in the number 1 cylinder 36 is removed. The luminosity probe 30 then is threadingly inserted into the glow plug opening in such cylinder, so that the threads on the exterior surface 34 of the luminosity probe distal housing portion 32 engage the complementarily configured threads on the interior side walls of the glow plug opening. For such purpose, the luminosity probe may be screwed into the glow plug opening with the use of a wrench whose gripping surfaces engage the intermediate boss portion 38 of the luminosity probe.

Once installed in the number 1 cylinder of the diesel engine, with the engine running, and the timing assembly 10 assembled as shown in the schematic representation of FIG. 1, the intermittent combustion of fuel in the number 1 cylinder of the diesel engine will produce a corresponding intermittent light which enters the distal housing portion of the luminosity probe and passes through the housing to a photocell (not shown in the FIG. 1 drawing, but illustrated in FIG. 2, and hereinafter described in greater detail) mounted therein. The photocell receives light transmitted into the housing, and generates an on or off signal depending on the respective presence or absence of light the photocell receives. The on or off signal from the photocell passes from the luminosity probe 30 into signal transmitting wire 42 joined to the proximal casing portion 40 of the probe. From signal transmitting wire 42, the on or off signal from the photocell passes into the amplifier module 44, in which it is amplified. The resulting amplified on or off signal then is passed to the secondary windings of the coil 16 by electrical wire 50.

In such mode, the high voltage coil wire 78 is effectively grounded to a spark plug 79 in the apparatus, to carry the voltage to ground.

Concurrently, the amplification circuitry in amplifier module 44 is connected to the negative secondary terminal of the high voltage coil by signal wire 50. Thus, a signal is generated in the high voltage coil 16 and passed to high voltage wire 78. The inductive signal pick-up wire 70 is coupled at one end to the high voltage wire 78 by means of the timing light magnetic pick-up clamp 81; at its opposite end, the inductive signal pick-up wire 70 is joined to the timing light gun 64. The amplifier module 44 is powered by power supply 18 which is connected to the module by wires 54 and 58.

The power supply 18, which as indicated may be a conventional automotive battery, also is connected to the wire 74, by means of branch line 72. Wire 74 is connected at one end thereof to timing light gun 64 and is connected at its other end to the positive terminal of the high voltage coil 16, so that power is supplied from the power supply 18 to the coil 16 by wires 72 and 74. Finally, the timing light gun 64 also is connected to the power supply 18, by means of electrical wire 60.

The timing light gun thus receives a pulsed electrical signal corresponding to the on or off signal generated by the photocell in illuminosity probe 30. When the timing light gun then is actuated by manually depressing trigger 66, a bright stroboscopic light 68 is generated, which is directed by the mechanic at timing mark 26 on flywheel 22, to provide a visual indication of the disparity, if any, between the position of the timing mark on the flywheel and the position of the fixed mark 28 on the stationary engine structure. If there is any disparity between the respective positions of the timing marks 26 and 28, the injection pump of the diesel engine 14 (not shown for clarity) is adjusted until the respective timing marks 26 and 28 are in register. At this point, the engine timing is set in accordance with the fixed timing mark 26, reflecting the engine manufacturer's timing specifications.

The amplifier module 44 may further comprise suitable circuitry for a crankshaft degree gauge 46, so that this gauge which is operatively connected to the amplifier to visually indicate the crank degree of timing.

The crankshaft degree gauge may be employed to "fine tune" the adjustment of the crank degree of timing, after a gross alignment of the respective timing marks has been achieved with the timing light gun 64 in the manner previously described. Alternatively, the crankshaft degree gauge may be utilized in lieu of the timing light gun, to provide a visual output on the basis of which the injection pump may be adjusted to secure a desired timing, in terms of a predetermined number of degrees relative to top-dead-center and the combustion event. It will therefore be recognized that the crankshaft degree gauge 46 is not an essential element of the timing system schematically illustrated in the FIG. 1 embodiment, but such gauge and associated circuitry may however be used, in addition to or in substitution of the timing light gun therein.

The amplifier module 44 may further comprise as an additional optional feature a tachometer 48 which is operatively connected by suitable circuit means to the amplifier and timing light, to visually indicate the engine speed.

It will be recognized that the amplifier module 44 comprises conventional amplifier circuitry which may be readily obtained or fabricated by those skilled in the art.

In practice, it may be feasible to provide the amplifier module 44 as constituent part of the timing light gun 64, with the amplifier circuitry comprising microcircuitry, and with the crankshaft degree gauge and/or tachometer being optionally provided on the timing light gun. Alternatively, the various components of the diesel engine timing system, or selected ones thereof, may be provided in other unitary housings or structures, for ease of storage, handling, and operation.

Figure 2:
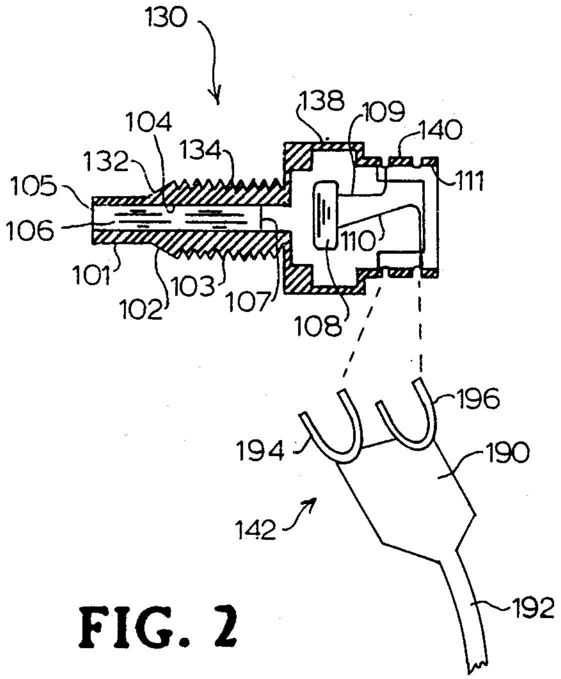
FIG. 2 is a cross-sectional, side elevation view of a luminosity probe and photocell unit such as may be usefully employed in the diesel engine timing assembly of the present invention, together with a perspective view of an end portion of an associated signal cable.

FIG. 2 shows a cross-sectional, side elevation view of a luminosity probe 130, of a type such as may be usefully employed in a timing assembly of the type illustratively shown and described with reference to FIG. 1 hereof. Also shown in FIG. 2 is an end portion, in perspective view, of a cable and clip connector assembly 142, for coupling the luminosity probe to an amplifier, to generate an amplified on or off signal for passage to a timing device such as a timing light or a crankshaft degree gauge. As shown in FIG. 2, the luminosity probe housing comprises a distal housing portion 132, including a frontal cylindrical section 101, a truncated frustoconical transition section 102, and a main rear section 103 whose exterior surface 134 is threaded complementarily to the threading of glow plug openings in the diesel engine(s) to be serviced by the timing system comprising the luminosity probe.

The distal housing portion 132 of the luminosity probe contains an axial bore 104 extending from the frontal open end of the distal housing portion and extending rearwardly into the probe. In axial bore 104 is disposed a light pipe 106. The light pipe has a frontal end surface, at the open end of the axial bore, and extends axially in the bore to a rear end 107.

The light pipe 106 is mounted in the axial bore 104 in a close-fitting fashion, to provide a gas-tight seal against bypassing ("blow by") of combustion gases from the diesel engine cylinder in which the luminosity probe is mounted. For this purpose, the light pipe may be annularly sealed against the interior surface of the axial bore by a suitable adhesive or bonding material. Within the intermediate boss portion 138 and proximal casing portion 140 of the probe housing is mounted a photocell 108, which may for example be a conventional cadmium sulfide photocell. The photocell comprises leads 109 and 110, which are secured to the connection structure 111 of the proximal casing portion 140.

The luminosity probe shown in FIG. 2 has been illustrated as being of unitary integral construction as regards the distal housing portion 132, the intermediate boss portion 138, and the proximal casing portion 140. It will be recognized, however, that in some instances it may be desirable to construct the probe in separate segments, as for example a distal housing portion which is separate from a boss/casing portion, and is detachably coupled therewith. Such detachably coupled arrangement may for example be advantageous in replacing a light pipe or photocell after a period of extended use, or in the event of breakage of or damage to these respective components.

Operatively connectable to the connection structure 111 of the luminosity probe is a connector cable 142 comprising a main connector body 190 joined to signal transmission cable 192. At the frontal end of the main connector body 190 are provided respective terminal attachment clips 194 and 196. These clips are matable with the casing portion 140 of the luminosity probe, for signal transmitting connection of the clips with the connecting structure 111 in the casing portion.

In operation, light generated by combustion of fuel in a selected cylinder of the diesel engine in which the luminosity probe is disposed, impinges on the distal face 105 of the light pipe 106 in axial bore 104. The combustion light then is transmitted axially along the light pipe and in turn impinges on photocell 108. The photocell thus receives light transmitted into the housing, and generates an on or off signal depending on the respective presence or absence of light it receives. This on or off signal then is transmitted via leads 109 and 110, and clips 194 and 196, to signal transmission cable 192 for passage to the signal processing circuitry in the previously described manner.

The light pipe 106 may be formed of any suitable material of construction capable of adequate functioning under the elevated temperature and pressure conditions which it encounters in service. The light pipe thus may be formed for example of a high-temperature, heat-resistant glass. It will be recognized that the luminosity probe housing, in lieu of the specific construction described, may simply comprise a sealed housing formed of a light-transmissive material, to transmit combustion light into the housing for impingement on the photocell mounted therein. Nonetheless, it generally is satisfactory in practice to utilize a light pipe in the specific construction shown in FIG. 2, to achieve direction of the combustion light in a guided and focused fashion onto the active sensing surface of the photocell.

Figure 3:
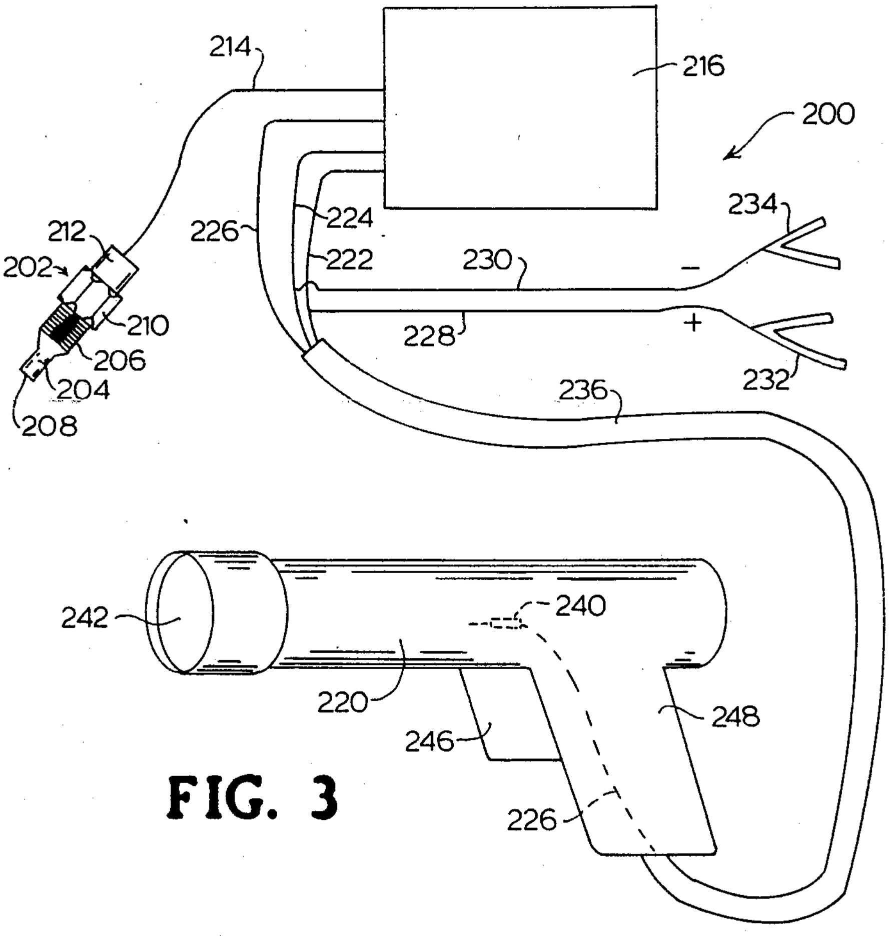
FIG. 3 is a schematic representation of a diesel engine timing assembly according to another embodiment of the invention.

Referring now to FIG. 3, there is shown a schematic representation of a diesel engine timing assembly according to another embodiment of the present invention. The illustrated timing assembly 200 comprises a luminosity probe 202 similar in construction to those illustratively described hereinabove. The probe housing includes a distal housing portion 204 exteriorly threaded on surface 206 thereof, and light-transmissive in character at its distal end face 208, to transmit combustion light from a selected diesel engine cylinder into the housing. The housing of probe 202 further comprises an intermediate boss portion 210 and a proximal casing portion 212. The proximal casing portion is joined by the on or off signal transmission wire 214 to the amplifier module 216.

Joined to the signal processing module 216 and connecting same with the timing light 220 are respective positive and negative electrical wires 222 and 224, and pulse-to-light signal transmitting wire 226. The positive and negative wires 222 and 224 from the module are respectively connected to power supply lines 228 and 230, which in turn are connected to a power source (not shown) such as a conventional 12-volt automotive battery, by means of the respective connector clips 232 and 234.

The wires 222, 224, and 226, subsequent to the junctions of the respective positive and negative wires 222 and 224 with the battery pick-up lines 228 and 230, are encased in a suitable sheathing 236 extending to the timing light gun 220. In the timing light gun, the signal transmitting wire 226 is joined to a diode 240, which in turn is operatively connected to the wiring and circuitry (not shown) actuating the strobe light 242 in the timing light gun.

The timing light gun 220 also is provided with a trigger 246, so that the gun may be manually grasped by its handle portion 248 and the trigger 246 selectively manually depressed toward the handle, to actuate the timing light in a conventional manner. Again, as previously discussed, it may be advantageous in some instances to incorporate the electronics circuitry module 216 in the timing light gun 220, thereby providing a unitary timing light device which is connectable to the automotive battery and the luminosity probe in a simple and ready manner.

In the operation of the device schematically illustrated in FIG. 3, the luminosity probe 202 is mounted in the glow plug opening of a selected engine cylinder of a diesel engine at operating temperature, and, with the clips 232 and 234 attached to the respective negative and positive terminals of the power supply, the trigger 246 of the timing light gun 220 is depressed to actuate the generation of stroboscopic light from the timing light 242. Such light then may be directed at a moving engine part comprising a positionally adjustable timing mark, for alignment of the adjustable timing mark with a proximately positioned stationary timing mark, in the previously described manner.

It therefore is apparent from the foregoing description the timing apparatus of the presention invention is simple in construction, of low cost, and easily assembled and readily used.

Further, relative to the dual probe timing systems proposed in the prior art which comprise an optical sensing probe and a magnetic sensing probe, the timing apparatus of the present invention wholly eliminates the magnetic sensing means and the associated magnetic signal transmission and signal processing means, thereby achieving a substantial improvement over such prior art systems. Relative to such prior art optical/magnetic timing systems, the timing system of the present invention has the following distinct features and advantages:

(1) In the prior art optical/magnetic timing systems, a combustion light signal is transmitted through a phototransistor in signal form. In the present invention the combustion light is received by a photocell which is acting as an on/off switch.

(2) In the prior art optical/magnetic timing systems, the signal from the phototransistor, along with the magnetic signal from the magnetic probe (as indicated, both signals are required in these prior art systems), is converted into a digital output corresponding to an uncertain number of timing degrees. In the timing system of the present invention, a photocell (only one is required, with no need of a magnetic probe} acts as an on/off switch and is connected with a conventional strobe-type timing light, to produce a stroboscopic light output which when directed at the rotating crank pulley or flywheel allows simple and direct adjustment of the diesel engine timing, to achieve an exact desired degree value relative to top-dead-center and the combustion event.

(3) In contrast to the prior art optical/magnetic timing systems, which require a special magnetic connection structure on the diesel engine (which the majority of diesel engines do not have), the timing system of the present invention is readily adapted to the timing adjustment of any conventional diesel engine, using a conventional strobe-type timing light apparatus.

While the invention has been shown and described with respect to the specific illustrative embodiments, it will be recognized that the scope and utility of the invention are not thus limited, since numerous modifications, variations, and other embodiments will be readily apparent to those skilled in the art, and thus are to be regarded as being within the spirit and scope of the invention.

What is claimed:

1. A diesel engine timing light assembly for a diesel engine system including a high voltage coil and a power supply, said timing assembly comprising:

(a) a luminosity probe comprising a housing adapted to be mountable in a glow plug opening of a selected cylinder of a diesel engine, said housing comprising a light-transmissive housing portion adapted to transmit light from combustion of fuel in said selected cylinder into the housing;

(b) a photocell mountable in the luminosity probe housing for receiving light transmitted into the housing and generating an on or off signal depending on the respective presence or absence of light received by the photocell;

(c) an inductive pick-up, strobe-type timing light operatively connectable (1) to said coil by an electrical wire joined at one end thereof to the timing light and attachable at an opposite end thereof to a positive secondary terminal of the coil and (2) to said power supply; and (d) an amplifier operatively attachable: (i) in signal receiving relationship to said photocell, for receiving said on or off signal therefrom, and amplifying same to produce an on or off output signal; (ii) to said power supply; and (iii) to said coil by: (A) a first electrical wire joined at one end thereof to the amplifier and attachable at an opposite end thereof to said positive secondary terminal of the coil; and (B) a second electrical wire joined at one end thereof to the amplifier and attachable at an opposite end thereof to a negative secondary terminal of the coil, the first and second electrical wires, at their said one ends joined to the amplifier, being in electrical connection with amplifier circuitry means for generating said on or off output signal, and with said amplifier being attachable to said photocell by a third electrical wire connectable at one end thereof to the amplifier circuitry means and at an opposite end thereof to said photocell, so that said on or off output signal is transmittable from the amplifier to the coil, to generate a corresponding voltage signal which is inductively transmittable from the coil to said timing light when operatively connected therewith.

2. A diesel engine timing assembly according to claim 1, wherein said luminosity probe housing is of generally tubular shape, and comprises a threaded exterior surface portion for threadably mounting the housing in the glow plug opening of the selected cylinder of the diesel engine.

3. A diesel engine timing assembly according to claim 1, wherein the photocell is a cadmium sulfide photocell.

4. A diesel engine timing assembly according to claim 1, further comprising switch means for selectively actuating or deactuating said timing light and amplifier.

5. A diesel engine timing assembly according to claim 1, which is devoid of any magnetic probe or magnetic sensing structure.

6. A diesel engine timing assembly according to claim 1, wherein said luminosity probe housing is of generally tubular shape and said light-transmissive housing portion comprises a distal open end, further comprising a light pipe extending axially in said housing, said light pipe having a distal end in proximity to said open end of said housing, and with the photocell mounted in the housing in proximity to a proximal end of said light pipe.

7. A diesel engine timing assembly according to claim 1, wherein said amplifier and said timing light are comprised in a single hand-held timing unit.

8. A diesel engine timing assembly according to claim 7, wherein said timing unit further comprises an adjustable crankshaft degree gauge and/or a tachometer operatively connected to said amplifier.

9. A diesel engine timing assembly according to claim 1, further comprising an adjustable crankshaft degree gauge operatively connected to said amplifier to visually indicate the crank degree of timing.

10. A diesel engine timing assembly according to claim 1, further comprising a tachometer operatively connected to said amplifier to visually indicate the engine speed.

11. A diesel engine timing assembly for a diesel engine system including a high voltage coil and a power supply, said timing assembly comprising:

(a) a luminosity probe comprising a photocell, mountable in effective relationship to a selected cylinder of a diesel engine to receive light from combustion of fuel in the selected cylinder, so that the photocell generates an on or off signal depending on the respective presence or absence of light it receives;

(b) electronic circuitry means for receiving the on or off signal generated by the photocell, and generating a corresponding amplified on or off output signal, said electronic circuitry means comprising on amplifier operatively attachable: (i) in signal receiving relationship to said luminosity probe for receiving said on or off signal therefrom, and amplifying same to produce said on or off output signal; (ii) to said power supply; and (iii) to said coil by (A) a first electrical wire joined at one end thereof to the amplifier and attachable at an opposite end thereof to a positive secondary terminal of the coil; and (B) a second electrical wire joined at one end thereof to the amplifier and attachable at an opposite end thereof to a negative secondary terminal of the coil, the first and second electrical wires, at their said one ends joined to the amplifier, being in electrical connection with amplifier circuitry means for generating said on or off output signal, and with said amplifier being attachable to said photocell by a third electrical wire connectable at one end thereof to the amplifier circuitry means and at an opposite end thereof to said photocell, so that said on or off output signal is transmittable from the amplifier to the coil, to generate a corresponding voltage signal; and (c) light-generating means receiving said voltage signal and producing a corresponding pulsed visible light output for timing purposes, said light-generating means being operatively connectable to: (1) said coil by an electrical wire joined at one end thereof to the light-generating means and attachable at an opposite end thereof to the positive secondary terminal of the coil; and (2) said power supply.

12. A method of adjusting the timing of a diesel engine to a selected value, comprising:

(a) providing a diesel engine timing assembly according to claim 11;

(b) providing a diesel engine at operating temperature and with fixed and adjustable timing marks on respective stationary and motive portions of said engine;

(c) passing light from combustion of fuel in a selected cylinder of the engine to the photocell of the luminosity probe, to generate an on or off signal depending on the respective presence or absence of light received by the photocell;

(d) processing the on or off signal in the electronic circuitry means to produce a corresponding amplified on or off output signal, and actuating the light-generating means by said signal to produce a pulsed visible light output;

(e) directing said pulsed visible light output from said light-generating means onto the engine comprising said fixed and adjustable timing marks; and (f) adjusting the engine, to bring the fixed and adjustable timing marks into a selected alignment relationship with one another.

* * * * *